United States Patent [19]
Le Carvennec et al.

[11] Patent Number: 6,091,697
[45] Date of Patent: Jul. 18, 2000

[54] OPTICAL RECORDING MEDIUM HAVING A PLURALITY OF RECORDING LAYERS

[75] Inventors: François Le Carvennec, Senlisse; Jean-Pierre Huignard, Paris; Claude Puech, Ballainvilliers, all of France

[73] Assignee: Thomson-CSF, Paris, France

[21] Appl. No.: 08/894,367

[22] PCT Filed: Dec. 13, 1996

[86] PCT No.: PCT/FR96/02005

§ 371 Date: Aug. 21, 1997

§ 102(e) Date: Aug. 21, 1997

[87] PCT Pub. No.: WO97/23872

PCT Pub. Date: Jul. 3, 1997

[30] Foreign Application Priority Data

Dec. 21, 1995 [FR] France ................... 95 15256

[51] Int. Cl.⁷ ........................................ G11B 7/24
[52] U.S. Cl. ............................... 369/275.1; 369/94
[58] Field of Search .................. 369/275.1, 94, 369/281, 280, 283, 286, 58

[56] References Cited

U.S. PATENT DOCUMENTS

| | | |
|---|---|---|
| 3,909,608 | 9/1975 | Le Merer et al. . |
| 3,936,139 | 2/1976 | Huignard et al. . |
| 3,945,790 | 3/1976 | Puech . |
| 4,020,278 | 4/1977 | Carre et al. . |
| 4,024,513 | 5/1977 | Huignard et al. . |
| 4,037,251 | 7/1977 | Bricot et al. . |
| 4,038,524 | 7/1977 | Puech et al. . |
| 4,039,764 | 8/1977 | Bricot et al. . |
| 4,052,706 | 10/1977 | Spitz et al. . |
| 4,068,258 | 1/1978 | Bied-Charreton et al. . |
| 4,157,931 | 6/1979 | Bricot et al. . |
| 4,199,783 | 4/1980 | Huignard et al. . |
| 4,449,785 | 5/1984 | Huignard et al. . |
| 4,612,587 | 9/1986 | Kaneko et al. ................ 360/59 |
| 4,888,266 | 12/1989 | Lacotte et al. . |
| 4,900,516 | 2/1990 | Engstrom et al. . |
| 5,258,969 | 11/1993 | Refregier et al. . |
| 5,303,225 | 4/1994 | Satoh et al. ................ 369/275.3 |
| 5,323,372 | 6/1994 | Puech et al. . |
| 5,428,597 | 6/1995 | Satoh et al. ................ 369/275.1 |
| 5,513,170 | 4/1996 | Best et al. ................ 369/275.1 |
| 5,659,536 | 8/1997 | Maillot et al. . |
| 5,745,473 | 4/1998 | Best et al. ................ 369/275.1 |
| 5,870,374 | 2/1999 | Satoh et al. ................ 369/275.1 |
| 5,883,878 | 3/1999 | Satoh et al. ................ 369/275.1 |

*Primary Examiner*—Tan Dinh
*Attorney, Agent, or Firm*—Oblon, Spivak, McClelland, Maier & Neustadt, P.C.

[57] ABSTRACT

Optical information recording/reading medium including at least one transparent layer (2) for recording or reading information in various strata (S1 to S3) distributed through the thickness of the medium. The medium includes, recorded in a principal plane at least the transparent layer with one or more information items (5) for carrying out either tracking, focusing, synchronization or addressing or any combination. Also included in each stratum is one more guidance information items (4).

16 Claims, 2 Drawing Sheets

OPTICAL RECORDING MEDIUM HAVING A PLURALITY OF RECORDING LAYERS

BACKGROUND OF THE INVENTION

FIELD OF INVENTION

The invention relates to an optical information recording/reading medium and more particularly to a medium making it possible to record information items in various planes through the thickness of the medium.

DISCUSSION OF BACKGROUND

Systems are known in the art which make it possible to record through the thickness of a material, in various strata, various series of information items (see for example French Patent 90 07284). This art is aimed at increasing the storage capacities of optical systems.

Currently used optical media take the form of discs rotating about an axis and the information items. are recorded on the disc in the form of concentric or spiral tracks. In thickness-wise recording various planes (or strata) inside the discs are intended to each contain information tracks.

Recording and reading in the various planes of the disc is carried out with the aid of a laser beam and an optic for focusing this beam. This optic must be able to form focusing spots at various depths beneath the surface of the disc. The focusing optic can also be displaced radially with respect to the disc so as to carry out the recording and reading of the various tracks of each plane of the disc.

When recording information, an optical recording stylus is used which includes for example an optic which can be displaced vertically with respect to the surface of the disc.

To do this, an optic is used which has a very low depth of field so that focusing is effective only in a very limited depth zone.

Several information strata are superimposed in this way by making provision for means for displacing the focal plane of the reading or writing optic in such a way as to allow focusing on a stratum (plane) chosen from several stacked strata.

The optic is also radially displaceable with respect to the axis of the disc. In this way, the whole useful surface of the disc can be scanned by the laser recording beam, for each of the information strata.

In a know technique, in order to adjust the focusing of the beam and allow the focusing point to follow a particular track in a stratum of the disc, guidance information elements are provided at the surface of the disc or on a principal face of the recording layer. When recording or reading, the optic is firstly focused on these information elements so as to effect focusing adjustment and tracking, and then the optic is displaced by a specified distance so that focusing takes place in the stratum to be recorded or to be read. The drawback of such a system lies in the fact that the optic exhibits inertia such that the displacement of the optic is not immediate. The time taken to displace the optic from the surface of the disc to the stratum to be recorded or to be read results in a decrease in the density of information contained in each stratum. Furthermore, the displacements have to be strictly identical from one usage to another usage.

According to another technique, it is possible to provide for a first beam which is focused onto a reference surface of the disc and at least one second beam which is focused through the thickness of the disc. The reference surface then includes guidance and focusing information items and the first beam is used for the focusing and guidance of the system. The second beam is locked to the first beam and serves for the recording or the reading through the thickness of the disc. The drawback of such a system is that the reproducibility of the positions of the focusings of the two beams is uncertain. For example, the angles of incidence of the beams on the disc can vary, which implies that from one usage to another there should be no relative inclination of the disc with respect to the optical head which emits the beams (tilt) in order to avoid parallax errors.

The objective of the invention is to solve these problems.

SUMMARY OF THE INVENTION

The invention therefore relates to an optical information recording/reading medium including at least one transparent layer making it possible to record or read information in various strata distributed through the thickness of the medium, characterized in that it includes, recorded in each stratum, one or more guidance information items making it possible to carry out functions of tracking and/or focusing, and/or synchronization, and/or addressing.

BRIEF DESCRIPTION OF THE DRAWINGS

The various subjects and characteristics of the invention will emerge more clearly in the description which follows and in the appended figures which represent.

Figure 1:
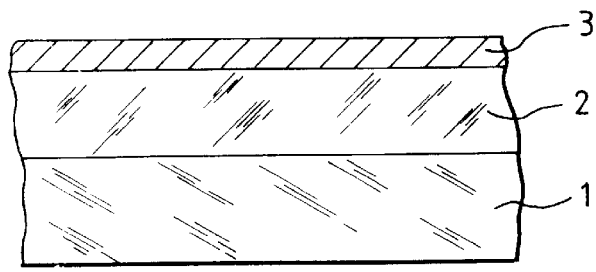
FIG. 1, an example of a structure of a recording medium to which the invention is applied.

The recording medium to which the invention is applied preferably has a structure such as represented in FIG. 1. It includes a transparent substrate 1, which on one of these faces bears a photosensitive or thermosensitive layer 2 and which makes it possible, based on a threshold, to induce a thickness-wise localized variation (reversible or irreversible) of the refractive index. The layer 2 can be covered with a protective varnish 3.

Figure 2A:
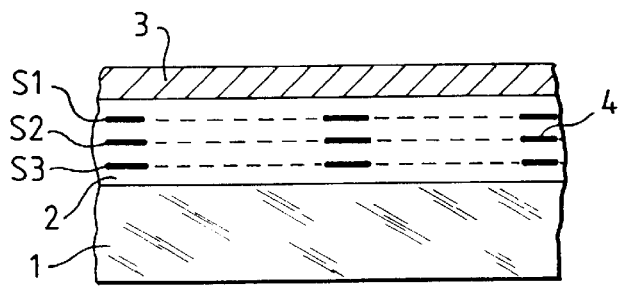
FIGS. 2a and 2b, an example of an embodiment of the recording medium according to the invention.

According to the invention, as represented in FIG. 2a, the layer 2 includes in different planes S1, S2, S3 contained through its thickness, guidance information elements 4 also called "preformat flags". These elements have positions which correspond to one another in the various strata. These flags can also contain addressing information items.

When it is wished to write or read in a stratum, the focusing optic is focused onto guidance elements of the chosen stratum and the beam guidance system is also adjusted onto these elements. Recording or reading can be carried out immediately after this adjustment without waiting for the abovementioned displacement of the optic.

FIG. 2 represents an example of tracks of a stratum of the medium of FIG. 2a. These tracks are viewed in a top view. The information elements are arranged in such a way as to effect a preformat termed "sampled preformat" according to which flags are arranged from place to place along the path of the track. Between two consecutive flags a non-recorded recording medium contains no mark or information item.

The medium is displaced under the recording beam (or reading beam) along the trajectory imparted to it until the next flag is encountered. When the recording medium is a disc, the latter rotates under the recording or reading beam. With each passing of a flag, the radial position and the focusing of the focusing optic are reset. Subsequently the disc continues to rotate without tracking adjustment up to the next flag.

Figure 2B:
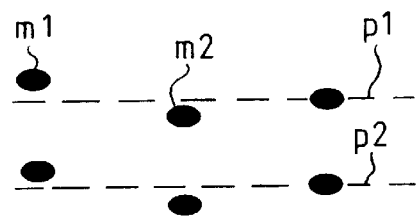

FIG. 2b represents two flags of two different tracks p1, p2. Each flag possesses at least two marks m1, m2 situated on either side of the track and devices which are known in the art are able to carry out tracking with the aid of marks thus arranged.

Figure 3A:
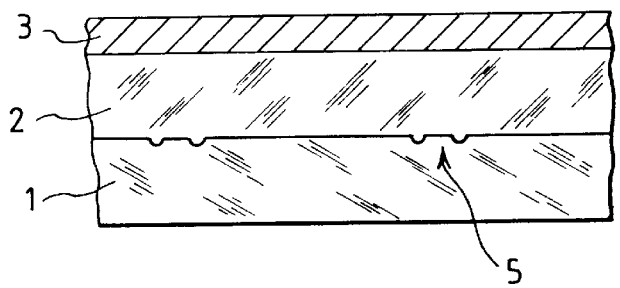
FIGS. 3a and 3b, a variant embodiment of the recording medium according to the invention.
Figure 3B:
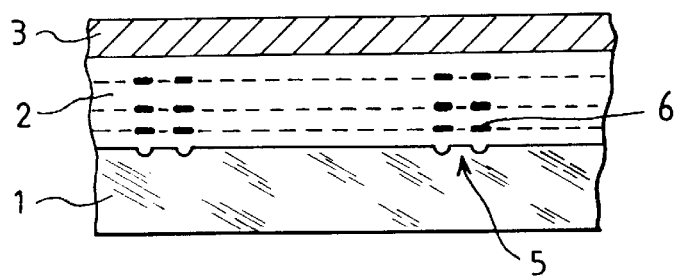

FIG. 3a represents a variant embodiment of a recording medium in which the transparent layer 2 serving for the recording possesses preformat flags on one of its faces.

These flags are made according to the example of FIG. 3a in the form of reliefs 5. These reliefs are subsequently used as reference for making the preformats 6 of the various strata, either in the factory, or on the user's recorder/reader, the user thus himself being able to preformat his recording medium.

Figure 4A:
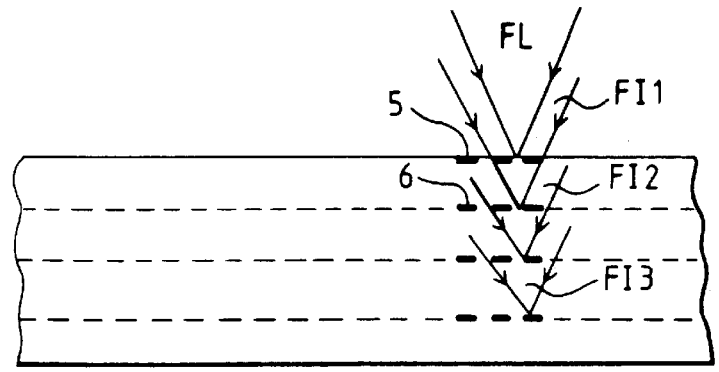
FIGS. 4a–4c illustrates the preformatting of the strata of a recording medium according to the present invention.

The preformatting of the various strata of a recording medium on the basis of a preformatting already carried out on one face of the medium can be undertaken, as represented in FIG. 4a, with the aid of at least two beams:
  a reading beam FL reads the preformatting information items already recorded, thus allowing guidance of the optical head;
  a registering beam FI1 focused on a stratum of the medium makes it possible to register the guidance information items. Registration thereof can be triggered by the reading of the preformatting information items read from the face of the medium.

As far as focusing is concerned, the beam FL has its point of focusing situated on the face of the recording medium. The distance between the points of focusing of the beams FL and FI1 is kept constant, thus making it possible to ensure that the plane of the stratum will be parallel to the face of the recording medium.

According to FIG. 4a provision is made for several registering beams FI1, FI2, FI3 to be tied to the reading beam FL so as to preformat several strata at the same time.

Figure 4B:
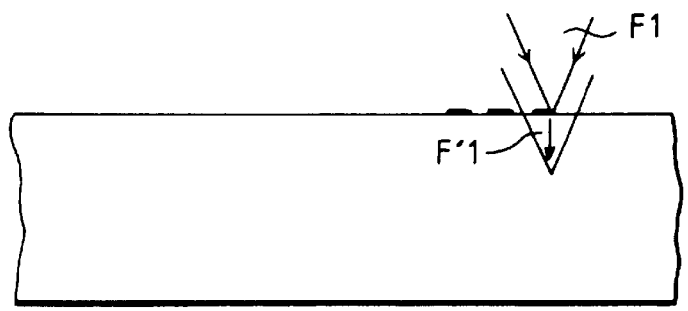

The preformatting can be carried out with the aid of a single beam F1 (FIG. 4b), which detects the preformatting information items already registered on a face of the disc and whose point of focusing is displaced from the face of the disc to the interior of the disc by a specified depth so as to preformat a stratum. The preformatting of the other strata will be undertaken in the same way.

Figure 4C:
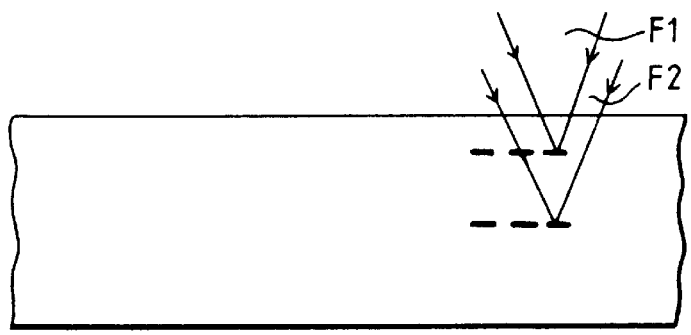

According to the invention, provision is also made to preformat various strata of a recording medium at the same time without using the preformatting already carried out. As carried out in FIG. 4c, several beams (2 for example) F1, F2 focused in two different strata planes and controlled at the same time make it possible to preformat these strata.

The invention therefore also relates to a recording medium which includes preformat information items 5 on a face of the photosensitive layer (for example in relief) as well as preformat information items 6. The information items 6 correspond to the preformat information items 5 and are arranged in the various strata to be recorded. The preformat information items 5 are made in the form of local refractive index variations.

Apart from the guidance information items, the recording medium according to the invention can include data information items recorded in one or more strata.

Figure 5:
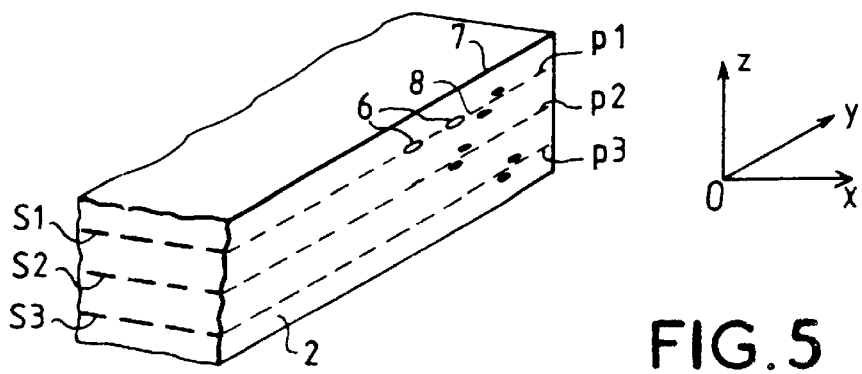
FIG. 5 illustrates a variant of the invention utilizing focusing marks on either side of each recording plane.

Referring to FIG. 5, a variant of the invention will be described according to which there is provided, for each recording plane situated through the thickness of the medium, focusing marks situated on either side of this plane. Preferably, for each recording plane there are at least two marks 7, 8 situated in a plane containing a track to be recorded or to be read (or a portion of track) and perpendicular to the recording plane. The two marks are equidistant with respect to the recording plane.

Represented in FIG. 5 are several recording planes S1, S2, S3 inside a medium 2. These planes are parallel to a reference plane xOy. For simplicity, straight tracks p1, p2, p3 parallel to the axis Oy are represented in these planes. The preformat information items 6 have been represented. The focusing marks 7, 8 for the track p1 are situated in a plane parallel to the plane yOz (perpendicular to the plane xOy) and containing the track.

They are equidistant from the track p1. They are offset one with respect to another in the direction Oy of displacement of the track. During focusing adjustment in respect of a reading or a registering of the track p1, the reading or registering beam will be focused if the marks 7 and 8 reflect and/or diffract the same quantity of light of a focusing adjustment beam towards an optical detection system. In the event of defocusing, these quantities of light are different and the detection system will make it possible to evaluate the value and direction of defocusing.

The invention has been described in the general form of a recording medium. A particularly preferential form is embodied in the form of a disc.

We claim:

1. An optical information recording/reading medium including at least one transparent layer wherein said medium includes a plurality of various strata including recorded information to be read wherein said strata are distributed through the thickness of the medium, said optical information medium comprising at least one guidance information item, recorded in each of said strata, wherein said guidance information items have positions which correspond to one another in the various strata and wherein said guidance items provide optic focusing and optical guidance information to provide preformatted strata.

2. Medium according to claim 1, characterized in that the guidance information items are printed on a principal of the recording medium.

3. Medium according to claim 1, characterized in that the medium is made of a material with photoinduced index variation and the guidance information items are recorded in the form of local index variations induced in the various strata.

4. Medium according to claim 1, characterized in that it includes, in at least one stratum, between the guidance information items, induced data information items.

5. Medium according to claim 1, characterized in that the recording medium is a disc.

6. Medium according to claim 1, characterized in that the guidance information items are registered along each track at regular intervals.

7. Medium according to claim 5, characterized in that each guidance information item includes at least two marks situated on respective sides of a track.

8. Medium according to claim 2, characterized in that each printed guidance information item is intended to be used to record in each stratum a corresponding guidance information item.

9. Medium according to claim 3, characterized in that the guidance information items of each stratum take the form of an index-variation guidance groove which is tracked by a differential reading system.

10. Medium according to claim 1, characterized in that it includes on respective side, of the plane of each stratum, in a plane perpendicular to the stratum plane, two focusing marks.

11. Medium according to claim 10, characterized in that the two focusing marks are the same distance from the stratum plane and are offset with respect to one another in a recording direction of the recording medium.

12. Process for recording guidance information items in a recording medium comprising guidance information items already recorded on a face of the medium, comprising the steps of:

reading the guidance information items with a reading beam; and controlling at least one registering beam positionally tied to the reading beam so as to register preformatting information items in accordance with a stratum of the medium.

13. Process for recording guidance information items in a recording medium comprising guidance information items already recorded on a face of the medium, comprising the steps of:

reading the guidance information items with a reading beam, and displacing the reading beam so as to register preformatting information items in accordance with a stratum of the medium.

14. Process according to claims 12, characterized in that the registering of preformatting information is a function the of reading of preformatting information by the reading beam.

15. Process for recording guidance information in a recording medium, comprising the steps of:

focusing plural registering beams in different planes of the medium; and controlling the plural registering beams simultaneously so as to register preformatting information items in the various strata of the medium.

16. Process according to claim 13, characterized in that the registering of preformatting information is tied to the reading of preformatting information by the reading.

* * * * *